United States Patent
Shimizu et al.

(10) Patent No.: US 7,762,148 B2
(45) Date of Patent: Jul. 27, 2010

(54) MAGNETOSTRICTIVE TORQUE SENSOR AND ELECTRIC POWER STEERING APPARATUS

(75) Inventors: Yasuo Shimizu, Saitama (JP); Shunichiro Sueyoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/797,553

(22) Filed: May 4, 2007

(65) Prior Publication Data
US 2007/0295111 A1    Dec. 27, 2007

(30) Foreign Application Priority Data
May 12, 2006   (JP)   ............ P. 2006-133844

(51) Int. Cl.
*G01L 3/00* (2006.01)
(52) U.S. Cl. ................................ 73/862.331
(58) Field of Classification Search ...............
73/862.331–862.338
See application file for complete search history.

(56) References Cited

U.S. PATENT DOCUMENTS

| | | | | |
|---|---|---|---|---|
| 5,321,985 A | * | 6/1994 | Kashiwagi et al. ..... | 73/862.335 |
| 5,442,966 A | * | 8/1995 | Hase et al. ............. | 73/862.335 |
| 5,526,704 A | * | 6/1996 | Hoshina et al. ........ | 73/862.335 |
| 5,589,645 A | * | 12/1996 | Kobayashi et al. ..... | 73/862.335 |
| 6,237,428 B1 | * | 5/2001 | Odachi et al. .......... | 73/862.333 |
| 6,412,356 B1 | * | 7/2002 | Kouketsu et al. ....... | 73/862.333 |
| 6,595,074 B2 | * | 7/2003 | Shimizu et al. ........ | 73/862.333 |
| 6,823,746 B2 | * | 11/2004 | Viola et al. ............ | 73/862.335 |
| 6,978,686 B2 | * | 12/2005 | Shimizu et al. ........ | 73/862.335 |
| 7,013,741 B2 | * | 3/2006 | Nakamura et al. ..... | 73/862.333 |

FOREIGN PATENT DOCUMENTS

| | | |
|---|---|---|
| JP | 60-173434 A | 9/1985 |
| JP | 11-59450 A | 3/1999 |
| JP | 2006-64445 A | 3/2006 |

* cited by examiner

*Primary Examiner*—Lisa M Caputo
*Assistant Examiner*—Octavia Davis
(74) *Attorney, Agent, or Firm*—Arent Fox LLP

(57) ABSTRACT

A magnetostrictive torque sensor having a first magnetostrictive film and a second magnetostrictive film, which are both provided on a shaft and have different magnetic anisotropies. A first detection coil and a second detection coil are arranged to face the first magnetostrictive film, and a third detection coil and a fourth detection coil are arranged to face the second magnetostrictive film. The first and second detection coils are wound around the same coil bobbin, while the third and fourth detection coils are wound around another common coil bobbin.

16 Claims, 4 Drawing Sheets

MAGNETOSTRICTIVE TORQUE SENSOR AND ELECTRIC POWER STEERING APPARATUS

The present invention claims priority from Japanese Patent Application No. 2006-133844 filed on May 12, 2006, the entire content of which is incorporated herein by reference.

BACKGROUND OF THE INVENTION

1. Technical Field

The present invention relates to a magnetostrictive torque sensor which has improved accuracy in detecting a torque on the basis of a change in magnetic characteristics resulting from a magnetostriction and a downsized or smaller electric power steering apparatus including the same.

2. Description of the Related Art

As a non-contact torque sensor, a magnetostrictive torque sensor, which detects a torque on the basis of a change in magnetic characteristics resulting from a magnetostriction, is known and used as a torque sensor for detecting a steering torque of an electric power steering apparatus (see, e.g., JP-A-2006-064445).

As shown in FIG. 4, a known magnetostrictive torque sensor 90, which is disclosed in JP-A-2006-064445, includes two magnetostrictive films 91, 92 provided on a rotary shaft 99. The magnetic anisotropies of the magnetostrictive films 91, 92 are different from each other. The magnetostrictive torque sensor 90 further includes a pair of detection coils 93, 94 arranged to face the magnetostrictive film 91 and to be separate from each other in an axial direction of the rotary shaft 99. First and second detection coils 95, 96 are arranged to face the magnetostrictive film 92 and to be separate from each other in the axial direction. As for the principle of the magnetostrictive torque sensor 90, when a rotational torque is applied to the rotary shaft 99, the magnetic permeability of the magnetostrictive films 91, 92 changes, wherein the inductance of each detection coil 93 to 96 also changes. The torque is detected based on a detected inductance change of each of coils 93 to 96.

For example, a torque detection output is calculated based on a difference between a detection output of the detection coil 93 and a detection output of the detection coil 96, or a torque detection output is calculated based on a difference between a detection output of the detection coil 94 and a detection output of the detection coil 95.

As for the manner in which the coils are arranged in a non-contact torque sensor, there is known an arrangement in which an exciting coil and a detecting coil are disposed at a same position with respect to an axial direction of a rotary shaft. There is also known an arrangement wherein the exciting coil is disposed outside the detecting coil in a radial direction (see, e.g., JP-A-11-059450).

Meanwhile, in the known magnetostrictive torque sensor of FIG. 4, a length of a magnetostrictive film in an axial direction is set according to a positional relationship of the detection coil facing the magnetostrictive film. However, a relative position between the magnetostrictive film and the detection coil in the axial direction varies due to a variation in the length of the detection coils in the axial direction or a variation in the position in which the detection coils are attached inside a gear housing. Therefore, in order to allow for a variation of the relative position between the magnetostrictive film and the detection coil in the axial direction, it is effective to set the axial length of the magnetostrictive film to be sufficiently longer than an axial length of the detection coil.

For example, in the case of the magnetostrictive torque sensor 90 shown in FIG. 4, an axial length of the magnetostrictive film 91 is set to be longer than a total axial length measured from an upper end of the detection coil 93 to a lower end of the detection coil 94. Similarly, an axial length of the magnetostrictive film 92 is set to be longer than a total axial length measured from an upper end of the detection coil 95 to a lower end of the detection coil 96.

However, when the axial lengths of the magnetostrictive films 91, 92 are set as described above, the total axial length measured from the upper end of the magnetostrictive film 91 to the lower end of the magnetostrictive film 92 becomes rather long since the detection coils 93 to 96 are arranged in the axial direction. Accordingly, the total length of the rotary shaft 99 becomes too long, such that a size of the magnetostrictive torque sensor 90 becomes rather large, thereby deteriorating mounting performance to a vehicle or an apparatus.

Furthermore, when the sensor 90 is used in a condition where a bending moment is applied to the rotary shaft 99, a strain due to the bending moment causes an error of the detected torsional torque.

In the magnetostrictive torque sensor 90 shown in FIG. 4, wherein the four detection coils 93 to 96 are arranged in the axial direction, the rotary shaft 99 is supported at one end thereof by a bearing 98. When a force P acts on a tip of the rotary shaft 99 in a direction that is orthogonal relative to the axial direction, the lengths L1, L2, L3, and L4 from the respective detection coils 93, 94, 95, 96 to the point of action are different from one another. Therefore, the bending moments at the respective positions of the detection coils 93 to 96 become P·L1, P·L2, P·L3, and P·L4, respectively, which are different from one another, wherein the strains in the respective detection coils 93, 94, 95, 96 are also different from one another. The different bending moments and corresponding strains generate an error in the detected torsional torque. In particular, when the axial distances between the respective detection coils are relatively long, the differences between the bending moments increase, wherein an error in the detected or measured torque increases.

Additionally, when the magnetostrictive torque sensor 90 is used as a steering torque sensor to detect the steering torque of a vehicle, the steering torque sensor is installed in a steering shaft between a steering wheel and a steering gear box. When the vehicle is stopped after a period of high-speed driving, the steering box is heated by the heat from the engine wherein the steering shaft is also heated. In such a case, a temperature distribution in the steering shaft is not uniform, and the temperature in a lower portion of the steering shaft closer to the engine becomes higher than that of an upper portion of the steering shaft which is remote relative to the engine. Therefore, the temperature of the steering shaft where the lowermost detection coil 96 is arranged becomes high, and the temperature of the steering shaft where the uppermost detection coil 93 is arranged becomes relatively low.

The magnetostrictive films 91, 92 have a temperature characteristic wherein their magnetic permeability $\mu$ increases as temperature increases. Therefore, when a temperature gradient is generated in the steering shaft in the axial direction thereof, an impedance of a detection circuit changes so that a detection output varies, wherein detection accuracy of the sensor decreases. When the axial length between the magnetostrictive films 91, 92 increases, a temperature difference accordingly increases. In such a case, a variation in the detection output increases wherein the detection accuracy decreases.

SUMMARY OF THE INVENTION

According to a first aspect of the invention, a magnetostrictive torque sensor is adapted to detect a torque applied to a shaft (e.g., a pinion shaft) and includes at least a first magnetostrictive film and preferably a second magnetostrictive film which are provided on the shaft. Each magnetostrictive film has a magnetic anisotropy that is different from the other. A first detection coil and a second detection coil are arranged to face the first magnetostrictive film. A third detection coil and a fourth detection coil are arranged to face the second magnetostrictive film. The first and second detection coils are wound around a coil bobbin, while the third and fourth detection coils are wound around another coil bobbin.

According to the above-described structural configuration of the present invention, the axial positions of the first and second detection coils relative to the pinion shaft can be made the same, as can the axial positions of the third and fourth detection coils relative to the same pinion shaft. As a result, the respective axial lengths of the first magnetostrictive film and the second magnetostrictive film are shortened or decreased, and the axial length between the first magnetostrictive film and the second magnetostrictive film is also shortened or decreased.

Also, the axial distance between the first detection coil and the second detection coil and the axial distance between the third detection coil and the fourth detection coil are each relatively short. Thus, even when a bending moment is applied to the shaft, a difference in the bending moment is reduced. Accordingly, a difference in strains caused by the bending moment is also reduced.

Furthermore, the axially spaced distance between the first magnetostrictive film and the second magnetostrictive film is relatively short. Thus, even when an axial temperature gradient is caused to exist along the shaft, a temperature difference between the first magnetostrictive film and the second magnetostrictive film is reduced, wherein a variation in detection output resulting from the temperature difference is significantly reduced. Moreover, the detection output of failure detection is not affected by the temperature gradient.

According to a second aspect of the invention, in the magnetostrictive torque sensor of the first aspect of the invention, the first detection coil and the second detection coil are wound around the coil bobbin in parallel in a state where the first detection coil and second detection coil are formed into a two-coil bundle. Also, the third detection coil and the fourth detection coil are wound around the other coil bobbin in parallel in a state where the third detection coil and fourth detection coil are formed into a separate two-coil bundle distinct from the two-coil bundle of the first and second detection coils.

According to the above-described structural configuration of the present invention, the first detection coil and the second detection coil or the third detection coil and the fourth detection coil are wound around the same coil bobbin in parallel in a state where they form a two-coil bundle. Thus, the detection outputs of the first detection coil and the second detection coil or the third detection coil and the fourth detection coil are almost the same.

According to a third aspect of the present invention, an electric power steering apparatus detects a steering torque using a magnetostrictive torque sensor and drives an electric steering motor according to the detected steering torque to steer a vehicle. The magnetostrictive torque sensor is the magnetostrictive torque sensor according to the first or second aspect of the present invention.

According to the above-described structural configuration of the present invention, since the size of the magnetostrictive torque sensor is decreased or downsized, the overall size of the electric power steering apparatus can also be decreased or downsized. In addition, since the torque detection accuracy of the magnetostrictive torque sensor is improved, a steering sensation of the electric power steering apparatus is also improved. Moreover, since the failure detection accuracy of the magnetostrictive torque sensor is improved, the reliability of the electric power steering apparatus is enhanced.

According to the first aspect of the present invention, the respective axial lengths of the first magnetostrictive film and the second magnetostrictive film are shortened, and the axial length from the first magnetostrictive film to the second magnetostrictive film is also shortened. Thus, the length of the shaft is shortened, and the size of the magnetostrictive torque sensor is decreased or downsized.

Also, any torque detection errors resulting from the bending moments are significantly reduced as compared with the aforementioned related art.

Moreover, even when an axial temperature gradient is caused to exist along the shaft, the torque detection accuracy as well as the failure detection accuracy is improved.

According to the second aspect of the present invention, the detection outputs of the first detection coil and the second detection coil or the third detection coil and the fourth detection coil are almost the same. Thus, compared with a case, for example, where one of the first detection coil and the second detection coil or the third detection coil and the fourth detection coil is wound around the radial inner periphery of the coil bobbin and then the other of the first detection coil and the second detection coil or the third detection coil and the fourth detection coil is wound around the radial outer periphery of the same coil bobbin, a variation between the detection values of one detection coil compared with those of the other detection coil is significantly reduced, wherein the overall detection accuracy is improved.

According to the third aspect of the present invention, since the overall size of the electric power steering apparatus is decreased or downsized, it is easier to mount the apparatus to a vehicle. Also, since the torque detection accuracy of the magnetostrictive torque sensor is improved, a steering feeling or sensation of the electric power steering apparatus is improved. Moreover, since the failure detection accuracy of the magnetostrictive torque sensor is improved, the reliability of the electric power steering apparatus is enhanced.

DETAILED DESCRIPTION OF THE PREFERRED EMBODIMENT

Hereinafter, a magnetostrictive torque sensor and an electric power steering apparatus according to an embodiment of the invention will be described with reference to FIGS. 1 to 3.

Figure 1:
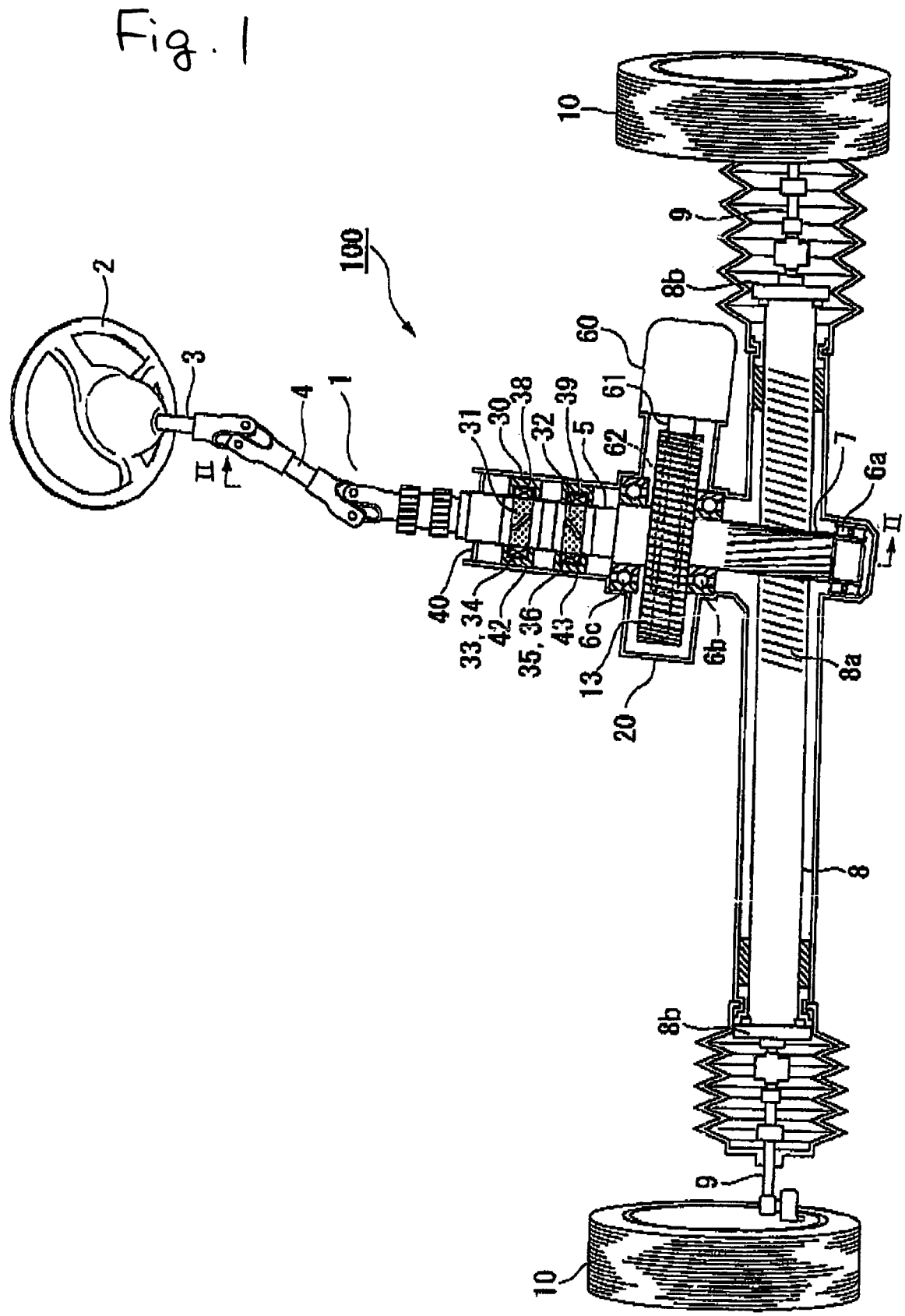
FIG. 1 is a schematic diagram showing a configuration of an electric power steering apparatus, including a magnetostrictive torque sensor, according to an embodiment of the present invention.
Figure 2:
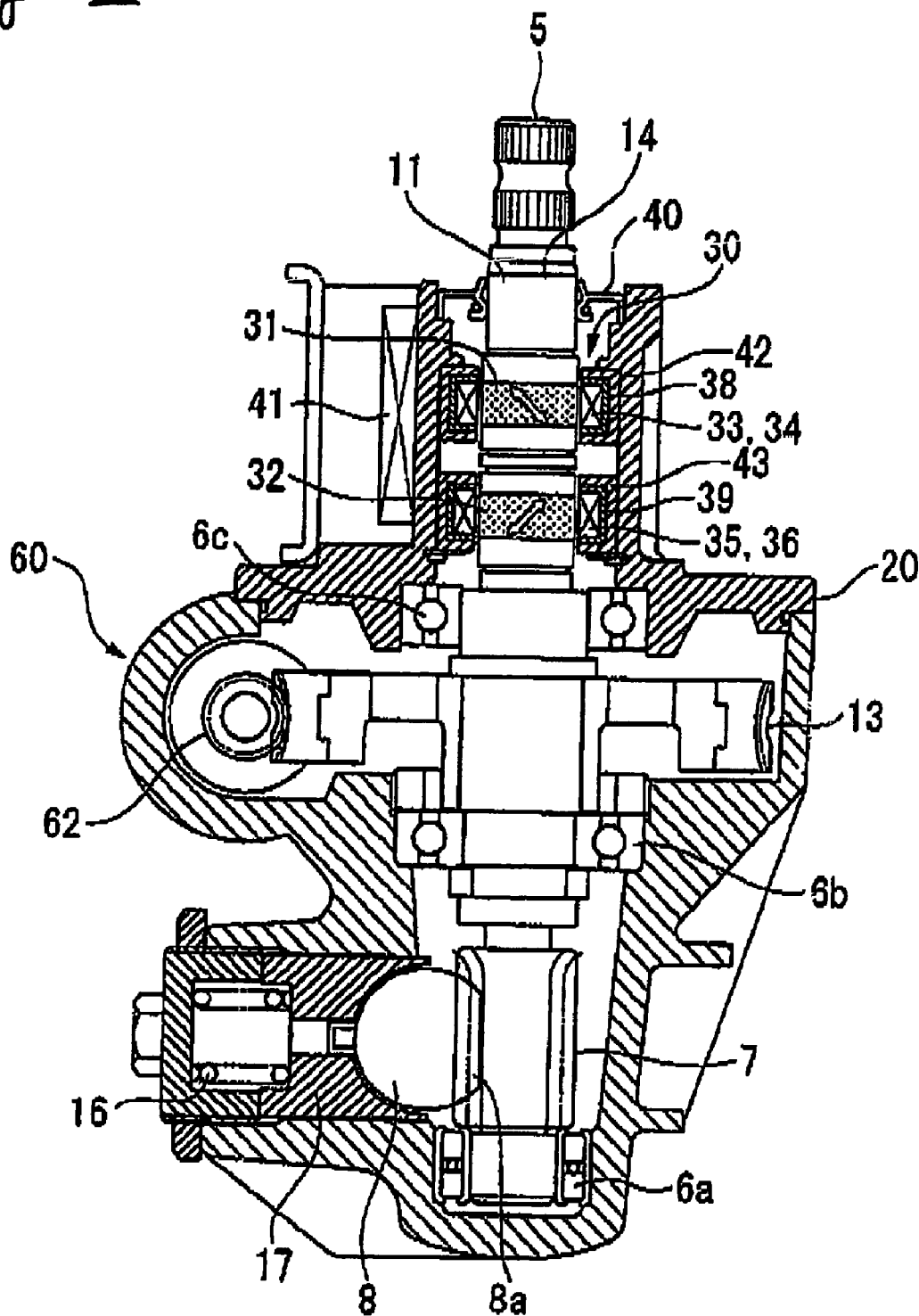
FIG. 2 is a cross-sectional view taken along line II-II of FIG. 1.

FIG. 1 is a schematic diagram showing a configuration of an electric power steering apparatus 100 of a vehicle, and FIG. 2 is a cross-sectional view taken along line II-II of FIG. 1.

The power steering apparatus 100 includes a steering shaft 1 connected to a steering wheel 2 (operation element). The steering shaft 1 includes a main steering shaft 3 integrally joined to the steering wheel 2, a pinion shaft 5 integrally provided with a pinion 7 of a rack and pinion mechanism, and a universal joint 4 which connects the main steering shaft 3 and the pinion shaft 5.

The pinion shaft 5 is accommodated in a gear housing 20. A lower part of the pinion shaft 5 is supported by a bearing 6a, and an intermediate part of the pinion shaft 5 is supported by at least one of bearings 6b and 6c. A worm wheel gear 13 is fitted between the bearings 6b and 6c for the pinion shaft 5. The pinion 7 is integrally formed at a lower end portion of the pinion shaft 5 between the bearings 6a and 6b, and the pinion 7 meshes with rack teeth 8a of a rack shaft 8 which is able to reciprocate in a width direction of the vehicle. The rack shaft 8 is pressed against the pinion 7 by a rack guide 17 which is biased by a spring 16 (FIG. 2). Tie rods 9 are coupled to each rack end 8b provided at respective ends of the rack shaft 8. Steered front wheels 10 are connected to the respective tie rods 9. The above-described structural configuration permits the performance of a general rack-and-pinion steering operation by steering the steering wheel 2, wherein the wheels 10 are steered to change a direction of the vehicle. It should be noted that the pinion shaft 5, the rack shaft 8 and the tie rods 9 define a steering system.

The electric power steering apparatus 100 further includes an electric steering motor 60 that is brushless and generates an auxiliary torque for reducing a steering power to be applied from the steering wheel 2. The steering motor 60 is attached to the gear housing 20 and has an output shaft 61 inserted into the gear housing 20. The output shaft 61 is formed with a worm gear 62 which meshes with the worm wheel gear 13. The worm gears 62 and 13 are also accommodated in the gear housing 20. The worm gears 62 and 13 define a speed reduction mechanism. The torque generated in the steering motor 60 is multiplied by the worm gears 62 and 13 and then transmitted to the pinion shaft 5.

A magnetostrictive torque sensor 30, which detects a torque on the basis of a change in a magnetic characteristic resulting from a magnetostriction, is arranged on the pinion shaft 5 above the bearing 6c. A space defined above the magnetostrictive torque sensor 30 and between the pinion shaft 5 and the gear housing 20 is sealed by an oil seal 40.

The electric power steering apparatus 100 detects a steering torque (a steering input) applied by a driver using the magnetostrictive torque sensor 30 and drives the steering motor 60 in accordance with the detected steering torque to steer the wheels 10.

The magnetostrictive torque sensor 30 includes first and second magnetostrictive films 31 and 32 which are annularly provided over the entire outer peripheral surface of the pinion shaft 5 above the bearing 6c. First and second detection coils 33 and 34 are arranged to face the first magnetostrictive film 31. Third and fourth detection coils 35 and 36 are arranged to face the second magnetostrictive film 32. Also, a detection circuit (not shown) is connected to each of the first to fourth coils 33, 34, 35, 36.

The first and second magnetostrictive films 31, 32 are metallic films made of a material having magnetic permeability which varies greatly with respect to a strain. For example, the first and second magnetostrictive films 31, 32 may be Ni—Fe-based alloy films formed by plating the outer periphery of the pinion shaft 5. The first and second magnetostrictive films 31, 32 are spaced apart from each other in an up-and-down direction along an axial direction of the pinion shaft 5.

The first magnetostrictive film 31 is arranged on an upper side and has magnetic anisotropy in a direction inclined at about 45 degrees with respect to the axis of the pinion shaft 5. The second magnetostrictive film 32 is arranged on a lower side and has magnetic anisotropy in a direction inclined at about 90 degrees with respect to the direction of the magnetic anisotropy of the first magnetostrictive film 31. Namely, the magnetic anisotropies of the two magnetostrictive films 31, 32 are different from each other by about 90 degrees in phase.

Figure 3:
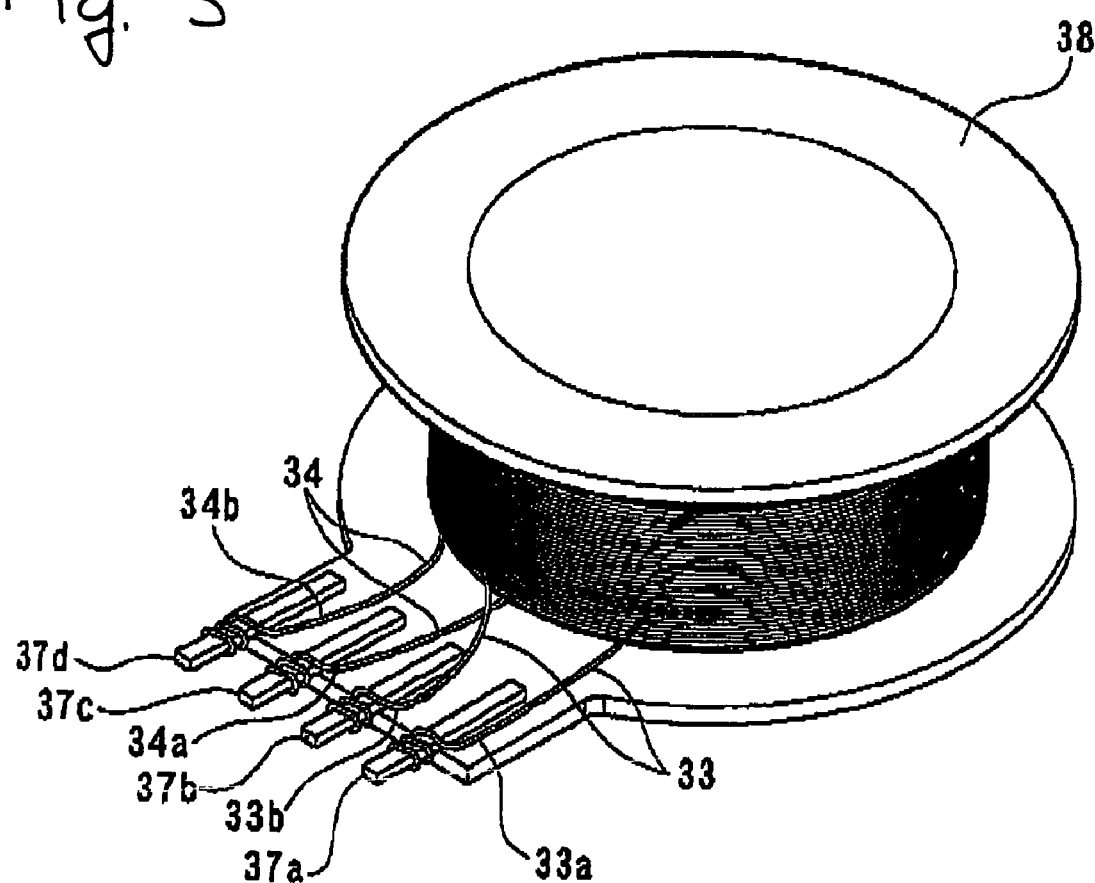
FIG. 3 is a perspective view of a coil bobbin around which a first detection coil and a second detection coil are wound.
Figure 4:
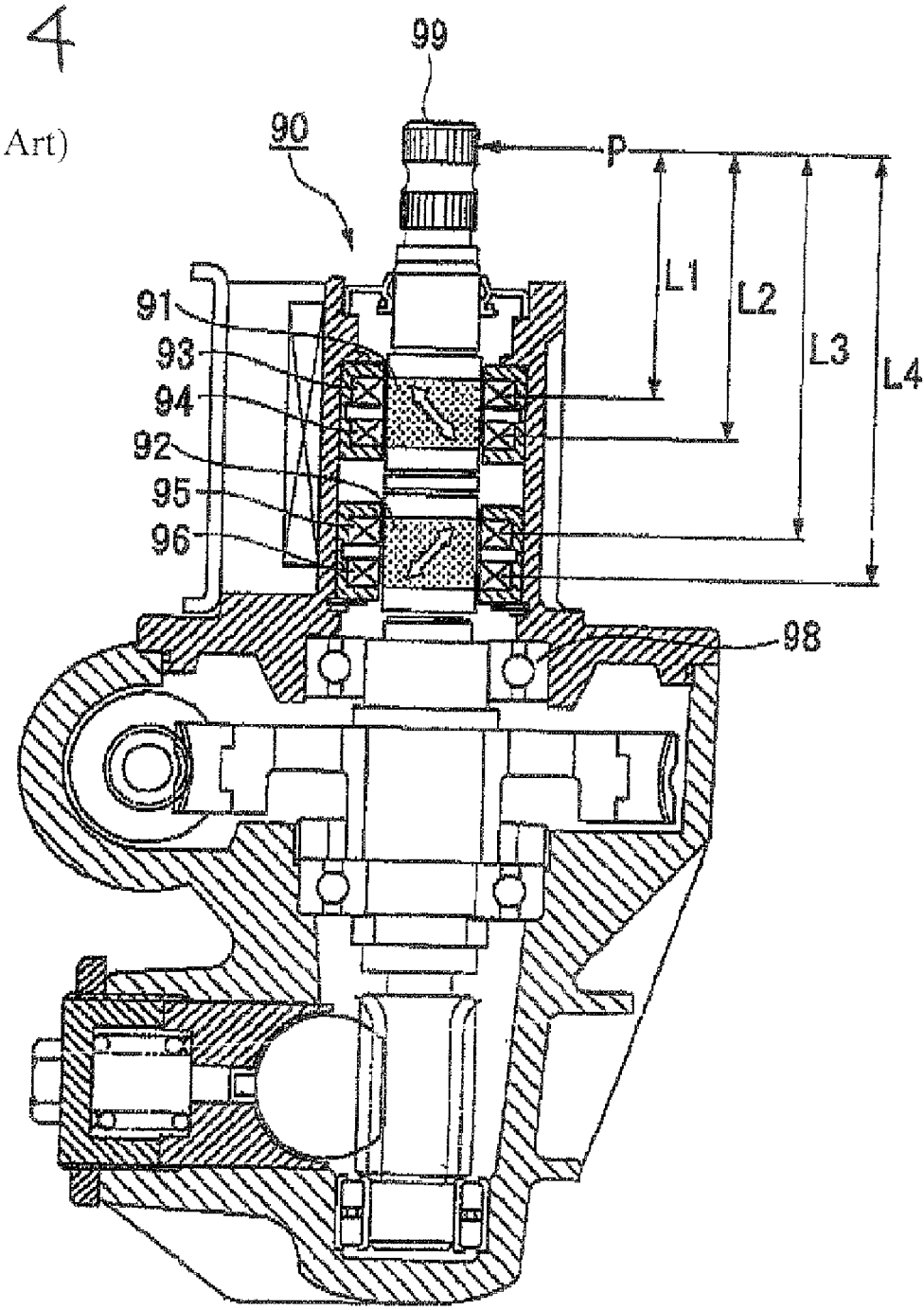
FIG. 4 is a cross-sectional view of a related art magnetostrictive torque sensor that is provided inside an electric power steering apparatus.

As shown in FIG. 3, the first and second detection coils 33 and 34 are wound around the same coil bobbin 38 in parallel in a state where the detection coils 33 and 34 are formed into a bundle, wherein the first and second detection coils 33 and 34 are uniformly distributed in radial and axial directions.

A starting end 33a (a beginning of winding) of the first detection coil 33 is connected to a coupling pin 37a. A terminal end 33b (an ending of winding) of the first detection coil 33 is connected to a coupling pin 37b. A starting end 34a (a beginning of winding) of the second detection coil 34 is connected to a coupling pin 37c. A terminal end 34b (an ending of winding) of the second detection coil 34 is connected to a coupling pin 37d. The coil bobbin 38 is attached to the gear housing 20 via a yoke 42. The first detection coil 33 and the second detection coil 34 are both wound around the coil bobbin 38 and are coaxially arranged around the first magnetostrictive film 31 with a predetermined gap therebetween. Namely, the axial positions of the first detection coil 33 and the second detection coil 34 with respect to the pinion shaft 5 are the same. The coupling pins 37a to 37d are connected to a control unit (not shown) via a circuit board of an interface 41.

Although not shown, the same is true for the third detection coil 35 and the fourth detection coil 36. That is, the two coils 35 and 36 are wound around the same coil bobbin 39 in a state where they are formed into a bundle, the coil bobbin 39 being attached to the gear housing 20 via a yoke 43. Thus, the coils 35 and 36 are coaxially arranged around the second magnetostrictive film 32 with a predetermined gap therebetween. In particular, with respect to the pinion shaft 5, the axial positions of the third detection coil 35 and the fourth detection coil 36 are the same.

The axial length of the first magnetostrictive film 31 is set to be slightly longer than the axial length of the first and second detection coils 33 and 34, and the axial length of the second magnetostrictive film 32 is set to be longer than the axial length of third and fourth detection coils 35 and 36.

By setting the magnetic anisotropies of the first and second magnetostrictive films 31, 32 as mentioned above, when a torsional torque acts on the pinion shaft 5, a compressive force acts on one of the magnetostrictive films 31, 32 while a tensile force acts on the other of the magnetostrictive films 31, 32. As a result, the magnetic permeability of one magnetostrictive film increases, while the magnetic permeability of the other magnetostrictive film decreases. Accordingly, the inductance of the two detection coils arranged around one magnetostrictive film increases, while the inductance of the two detection coils arranged around the other magnetostrictive film decreases. While the discussion above includes two magnetostrictive portions, it is within the scope of the present invention to provide a single, i.e., one, magnetostrictive portion and still obtain the desired results. For example, the one magnetostrictive portion may have an anisotropy that is inclined approximately 45 degrees with respect to an axis of the rotary shaft. When rotational torque is applied to the rotary shaft in one way, e.g., clockwise, magnetic permeability increases, wherein an amount of inductance also increases, and wherein the detection coil detects a positive signal. On the other hand, when the rotational torque is applied to the rotary shaft the other way, e.g., counterclockwise, the detection coil detects a negative signal. Therefore, the magnetostrictive portion with the above described anisotropy is effective to determine a direction in which the rotational torque is being applied to the rotary shaft. Further, the obtained detection signal is more linear than a detection signal obtained from a magnetostrictive portion having no anisotropy.

Also, the detection circuits connected to each of the first to fourth detection coils 33 to 36 convert respective changes in the inductance of each of the detection coils 33 to 36 resulting from magnetostriction into a voltage change, and then output the changes to the control unit. The control unit calculates a torque detection voltage VT3 on the basis of the respective outputs of each of the detection circuits, wherein a steering torque acting on the steering shaft 1 is detected. The control unit also calculates a failure detection voltage VTF3 to perform failure detection of the magnetostrictive torque sensor 30.

An example of a method of calculating the torque detection voltage VT3 and the failure detection voltage VTF3 will now be described.

The output voltage of a detection circuit connected to the first detection coil 33 is defined as V11 (hereinafter referred to as the output voltage V11 of the first detection coil 33). The output voltage of a detection circuit connected to the second detection coil 34 is defined as V12 (hereinafter referred to as the output voltage V12 of the second detection coil 34). The output voltage of a detection circuit connected to the third detection coil 35 is defined as V21 (hereinafter referred to as the output voltage V21 of the third detection coil 35). The output voltage of a detection circuit connected to the fourth detection coil 36 is defined as V22 (hereinafter referred to as the output voltage V22 of the fourth detection coil 36).

When calculating the torque detection voltage VT3, first, differential voltages VT31, VT32 are calculated according to Equations (1) and (2). It should be noted that k11, k12, k21, and k22 are proportional constants, V0 is a fixed number, and T is a steering torque.

$$VT31 = VT11 - VT21 + V0 = k11 \cdot T - (-k21 \cdot T) = (k11+k21)T \quad (1)$$

$$VT32 = VT12 - VT22 + V0 = k12 \cdot T - (-k22 \cdot T) = (k12+k22)T \quad (2)$$

In particular, the differential voltage VT31 is a differential voltage (differential output) between the first detection coil 33 arranged to face the first magnetostrictive film 31 and the third detection coil 35 arranged to face the second magnetostrictive film 32. The differential voltage VT32 is a differential voltage (differential output) between the second detection coil 34 arranged to face the first magnetostrictive film 31 and the fourth detection coil 36 arranged to face the second magnetostrictive film 32. Either one of VT31 or VT32 is used as the torque detection voltage VT3. Thus, two magnetostrictive portions not only generate amplified detection signals, but also cancel the occurrence of a temperature gradient using a relatively simple structure. Therefore, the use of two magnetostrictive portions can be implemented under or during high temperature conditions and continue to provide stable signals.

When calculating the failure detection voltage VTF, first, differential voltages VTF1 and VTF2 are calculated according to Equations (3) and (4).

$$VTF1 = VT11 - VT12 \quad (3)$$

$$VTF2 = VT21 - VT22 \quad (4)$$

In particular, the differential voltage VTF1 is a differential voltage (differential output) between the first detection coil 33 and the second detection coil 34 which are both arranged to face the first magnetostrictive film 31. The differential voltage VTF2 is a differential voltage (differential output) between the third detection coil 35 and the fourth detection coil 36 which are both arranged to face the second magnetostrictive film 33.

The failure detection voltage VTF3 is calculated from the sum of the differential voltages VTF1 and VTF2 according to Equation (5), and it is determined that there is a failure if the failure detection voltage VTF3 is out of a failure detection threshold value.

$$VTF3 = VTF1 + VTF2 \quad (5)$$

In the magnetostrictive torque sensor 30 of the electric power steering apparatus 100 having the structural configuration described above, the first and second detection coils 33 and 34 are wound around the same coil bobbin 38 in parallel in a state where they are formed into a bundle. Thus, the axial length of the first magnetostrictive film 31 is shortened compared with a case (e.g., the related art) where the first detection coil and the second detection coil are arranged such that they are separated in the axial direction of the pinion shaft 5. Similarly, the third detection coil 35 and the fourth detection coil 36 are wound around the same coil bobbin 39 in parallel in a state where they are formed into a bundle. Thus, the axial length of the second magnetostrictive film 33 is shortened compared with a case (e.g., the related art) where the third detection coil and the fourth detection coil are arranged such that they are separated in the axial direction of the pinion shaft 5. Moreover, the axial length from an upper edge of the first magnetostrictive film 31 to a lower edge of the second magnetostrictive film 32 is shortened.

As a result, a length of the pinion shaft 5 above the bearing 6c is shortened compared with the conventional sensor 90, wherein the total length of the pinion shaft 5 is shortened compared with the conventional sensor 90. Therefore, the overall size of the magnetostrictive torque sensor 30, as well as the electric power steering apparatus 100, is decreased or downsized, such that it becomes easier to mount the apparatuses to a vehicle.

In a case where a bending moment acts on the pinion shaft 5 due to an influence of the steering torque input from the steering wheel 2, a strain caused by the bending moment causes a detection error of the torsional torque. However, in the magnetostrictive torque sensor 30 according to the present invention, the axial positions of the first detection coil 33 and the second detection coil 34 with respect to the pinion shaft 5 are the same. Thus, the influence on the detection output of the first detection coil 33 due to the strain caused by the bending moment, and the influence on the detection output of the second detection coil 33 due to the strain caused by the bending moment become the same. Also, since the axial positions of the third detection coil 35 and the fourth detection coil 36 with respect to the pinion shaft 5 are the same, the influence on the detection output of the third detection coil 35 due to the strain caused by the bending moment, and the influence on the detection output of the fourth detection coil 36 due to the strain caused by the bending moment become the same. Moreover, since the axial distance between the first detection coil 33 and the second detection coil 34, and the third detection coil 35 and the fourth detection coil 36 is short, the difference in bending moments is small. Therefore the difference in the strain caused by the bending moments is also small.

Therefore, the occurrence of a torque detection error resulting from a bending moment is significantly reduced compared with the conventional sensor 90.

Also, even when a temperature gradient is caused in an axial direction of the pinion shaft 5, the axially spaced distance between the first magnetostrictive film 31 and the second magnetostrictive film 32 is short compared with the conventional sensor 90. Thus, a temperature difference between the first magnetostrictive film 31 and the second magnetostrictive film 32 is reduced, wherein a variation in the differential voltage VT31 between the first magnetostrictive film 31 and the second magnetostrictive film 32, as well as a variation in the differential voltage VT32 between the first detection coil 33 and the second detection coil 34, are also reduced. As a result, torque detection accuracy is improved, wherein a steering feeling of the electric power steering apparatus is improved.

Moreover, since the axial positions of the first detection coil 33 and the second detection coil 34 with respect to the pinion shaft 5 are the same, there is no temperature difference between the two detection coils 33 and 34. Accordingly, even when a temperature gradient is caused in an axial direction along the pinion shaft 5, there is no influence of the temperature difference on the calculation of the differential voltage VTF1 (=VT11-VT12). Similarly, since the axial positions of the third detection coil 35 and the fourth detection coil 36 with respect to the pinion shaft 5 are also the same, there is no temperature difference between the two detection coils 35 and 36. Accordingly, even when a temperature gradient is caused in the pinion shaft 5, there is no influence by the temperature difference on the calculation of the differential voltage VTF2 (=VT21-VT22). As a result, even when a temperature gradient is caused in the pinion shaft 5, there is no influence by the temperature gradient on the calculation of the failure detection voltage VTF3, wherein the failure detection accuracy improves. Thus, the reliability of the electric power steering apparatus is enhanced.

Moreover, since the first detection coil 33 and the second detection coil 34 or the third detection coil 35 and the fourth detection coil 36 are wound around the coil bobbin 38 or the coil bobbin 39 in parallel in a state where they are formed into a two-coil bundle, detection outputs of the first detection coil 33 and the second detection coil 34 or detection outputs of the third detection coil 35 and the fourth detection coil 36 are made to be almost the same. As a result, compared with a case where one of the first detection coil 33 and the second detection coil 34, or the third detection coil and the fourth detection coil, is wound around the radial inner periphery of the coil bobbin, while the other of the first detection coil 33 and the second detection coil 34 is wound around the radial outer periphery of the same coil bobbin thereafter, a variation in the detection values of the first detection coil 33 and the second detection coil 34 is significantly reduced, wherein the detection accuracy is improved. The same is true for the third detection coil 35 and the fourth detection coil 36. Namely, a variation in the detection values of the third detection coil 35 and the fourth detection coil 36 is significantly reduced, wherein the detection accuracy is also improved.

While the above-provided description has been made in connection with a particular embodiment of the present invention, it will be obvious to those skilled in the art that various changes and modifications may be made therein without departing from the spirit and scope of the present invention. Therefore, all such changes and modifications falling within the true spirit and scope of the present invention are to be covered by the following claims.

For example, while the present invention has been discussed with first and second magnetostrictive portions, it is also within the scope of the present invention to provide a single magnetostrictive portion on the shaft with a pair of coils facing same. Also, the torque to be detected by the magnetostrictive torque sensor is not limited to the steering torque, and the magnetostrictive torque sensor can be used for detecting various kinds of torque. Further, the first magnetostrictive film 31 and the second magnetostrictive film 32 may be provided integrally without being split. It is within the scope of the present invention to substitute the rotational shaft having at least one magnetostrictive portion with a metal shaft having a relatively large permeability. It is also within the scope of the present invention for the magnetostrictive portion to have zero (i.e., none) anisotropy and still perform as the above described magnetostrictive portion having anisotropy.

What is claimed is:

1. A magnetostrictive torque sensor, which detects a torque applied to a shaft, comprising:
    a magnetostrictive portion provided on the shaft; and
    first and second detection coils arranged to face the magnetostrictive portion,
    wherein the first and second detection coils are wound together around a coil bobbin in parallel to form a single bundle,
    positions of the first and second detection coils along an axial direction of the shaft are the same, and
    wherein the first and second detection coils are uniformly distributed around the shaft in radial and axial directions.

2. The magnetostrictive torque sensor according to claim 1, wherein the magnetostrictive portion is a first magnetostrictive portion, and further comprising:
    a second magnetostrictive portion provided on the shaft; and
    third and fourth detection coils arranged to face the second magnetostrictive portion,
    wherein the first detection coil and the second detection coil are wound around a first coil bobbin, and the third and fourth detection coils are wound around a second coil bobbin.

3. The magnetostrictive torque sensor according to claim 2, wherein a magnetic anisotropy of the second magnetostrictive portion is different from a magnetic anisotropy of the first magnetostrictive portion.

4. The magnetostrictive torque sensor according to claim 2, wherein at least one of the first and second magnetostrictive portions has a magnetic anisotropy that is inclined at about 45 degrees with respect to an axis of the shaft.

5. The magnetostrictive torque sensor according to claim 3, wherein the magnetic anisotropies of the first and second magnetostrictive portions are different from each other by approximately 90 degrees in phase.

6. The magnetostrictive torque sensor according to claim 2, wherein a torque of the shaft is detected by differential signals generated by either one of the first and third detection coils or, second and fourth detection coils.

7. The magnetostrictive torque sensor according to claim 2, wherein first differential signals are generated by the first and second detection coils, second differential signals are generated by the third and fourth detection coils, and wherein failure of the torque sensor is determined by a sum of the first and second differential signals.

8. The magnetostrictive torque sensor according to claim 1, further comprising third and fourth detection coils wherein the first and second detection coils, and the third and fourth detection coils are arranged to face the magnetostrictive portion.

9. The magnetostrictive torque sensor according to claim 1, wherein the magnetostrictive portion is made from a metallic film.

10. The magnetostrictive torque sensor according to claim 9, wherein the metallic film includes an Ni—Fe based alloy.

11. The magnetostrictive torque sensor according to claim 1, wherein the magnetostrictive portion is provided over the entire outer peripheral surface of the shaft.

12. The magnetostrictive torque sensor according to claim 1, wherein an axial length of the magnetostrictive portion is larger than a combined axial length of the first and second detection coils.

13. An electric power steering apparatus comprising:
a magnetostrictive torque sensor for detecting a steering torque of a shaft,
wherein the magnetostrictive torque sensor includes a magnetostrictive portion provided on the shaft; and
first and second detection coils arranged to face the magnetostrictive portion,
wherein the first and second detection coils are wound together around a coil bobbin in parallel to form a single bundle,
positions of the first and second detection coils along an axial direction of the shaft are the same, and
wherein the first and second detection coils are uniformly distributed around the shaft in radial and axial directions.

14. The electric power steering apparatus according to claim 13, wherein the shaft is integrally formed with a pinion gear which meshes with a rack gear.

15. The electric power steering apparatus according to claim 13, wherein the shaft is rotatably supported by at least one bearing.

16. The electric power steering apparatus according to claim 13, wherein the shaft includes a worm wheel which transmits an assist torque from a motor via a worm gear.

* * * * *